US009251715B2

(12) United States Patent
Hing et al.

(10) Patent No.: US 9,251,715 B2
(45) Date of Patent: Feb. 2, 2016

(54) DRIVER TRAINING SYSTEM USING HEADS-UP DISPLAY AUGMENTED REALITY GRAPHICS ELEMENTS

(71) Applicant: Honda Motor Co., Ltd., Tokyo (JP)

(72) Inventors: Victor Ng-Thow Hing, Sunnyvale, CA (US); Lee Beckwith, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 13/832,209

(22) Filed: Mar. 15, 2013

(65) Prior Publication Data

US 2014/0272812 A1 Sep. 18, 2014

(51) Int. Cl.
*G09B 9/05* (2006.01)
*G09B 9/04* (2006.01)
*G02B 27/01* (2006.01)

(52) U.S. Cl.
CPC *G09B 9/05* (2013.01); *G02B 27/01* (2013.01); *G09B 9/04* (2013.01); *G02B 2027/014* (2013.01)

(58) Field of Classification Search
CPC .......................................................... G09B 9/05
USPC ............................................................. 434/69
See application file for complete search history.

(56) References Cited

U.S. PATENT DOCUMENTS

| 5,051,735 | A | 9/1991 | Furukawa |
| 5,115,398 | A | 5/1992 | De Jong |
| 5,368,309 | A | 11/1994 | Monroe et al. |
| 5,440,428 | A | 8/1995 | Hegg et al. |
| 5,519,536 | A | 5/1996 | Hoehn |
| 6,285,317 | B1 | 9/2001 | Ong |
| 6,574,555 | B2 | 6/2003 | Mochizuki et al. |
| 6,708,087 | B2 | 3/2004 | Matsumoto |
| 6,735,517 | B2 | 5/2004 | Engelsberg et al. |

(Continued)

FOREIGN PATENT DOCUMENTS

| DE | 10130046 | 1/2003 |
| DE | 102012210145 | 7/2009 |

(Continued)

OTHER PUBLICATIONS

Office Action of U.S. Appl. No. 13/832,918 issued May 8, 2015.

(Continued)

*Primary Examiner* — Xuan Thai
*Assistant Examiner* — Robert P Bullington
(74) *Attorney, Agent, or Firm* — Rankin, Hill & Clark LLP

(57) ABSTRACT

A driver training system includes a training controller, a heads-up display device, and a driving cue adherence controller. The training controller is configured to receive inputs related to an operational state of a vehicle and an environment surrounding the vehicle, and to determine a driving cue based on the received inputs. The heads-up display device is configured to present the driving cue as an augmented reality graphic element in view of a driver by projecting graphic elements on a windshield of the vehicle. The driving cue adherence controller is configured to continuously determine a current level of adherence to the driving cue, and an aggregate level of adherence to the driving cue based on the continuously determined current level of adherence to the driving cue over a predetermined time period. The heads-up display device is configured to present the continuously determined aggregate level of adherence in view of the driver.

19 Claims, 7 Drawing Sheets

(56) References Cited

U.S. PATENT DOCUMENTS

| | | | |
|---|---|---|---|
| 6,774,772 B2 | 8/2004 | Hahn | |
| 6,947,064 B1 | 9/2005 | Hahn et al. | |
| 7,124,027 B1 | 10/2006 | Ernst | |
| 7,190,260 B2 | 3/2007 | Rast | |
| 7,216,035 B2 | 5/2007 | Hortner et al. | |
| 7,379,813 B2 | 5/2008 | Kubota | |
| 7,519,471 B2 | 4/2009 | Shibata et al. | |
| 7,565,230 B2 | 7/2009 | Gardner et al. | |
| 7,627,419 B2 | 12/2009 | Yoshida | |
| 7,647,170 B2 | 1/2010 | Sawaki et al. | |
| 7,783,422 B2 | 8/2010 | Tanaka | |
| 7,815,313 B2 | 10/2010 | Ito et al. | |
| 7,920,102 B2 | 4/2011 | Breed | |
| 8,135,536 B2 | 3/2012 | Matsunaga et al. | |
| 8,208,208 B2 | 6/2012 | Schwab | |
| 8,305,444 B2 | 11/2012 | Hada | |
| 8,352,181 B2 | 1/2013 | Hagiwara | |
| 8,358,224 B2 | 1/2013 | Seder et al. | |
| 8,406,990 B2 | 3/2013 | Barkowski et al. | |
| 8,411,245 B2 | 4/2013 | Lee et al. | |
| 8,620,575 B2 | 12/2013 | Vogt et al. | |
| 8,633,810 B2 | 1/2014 | Luo et al. | |
| 8,633,979 B2 | 1/2014 | Szczerba et al. | |
| 8,660,735 B2 | 2/2014 | Tengler et al. | |
| 8,686,872 B2 | 4/2014 | Szczerba et al. | |
| 8,686,922 B2 | 4/2014 | Breed | |
| 8,725,342 B2 | 5/2014 | Ferguson et al. | |
| 2004/0193347 A1 | 9/2004 | Harumoto et al. | |
| 2005/0004723 A1 | 1/2005 | Duggan et al. | |
| 2005/0071082 A1 | 3/2005 | Ohmura et al. | |
| 2005/0195383 A1 | 9/2005 | Breed et al. | |
| 2006/0262140 A1 | 11/2006 | Kujawa et al. | |
| 2007/0185644 A1 | 8/2007 | Hirose | |
| 2008/0046150 A1 | 2/2008 | Breed | |
| 2008/0318676 A1 | 12/2008 | Ham | |
| 2009/0005961 A1 | 1/2009 | Grabowski et al. | |
| 2009/0210257 A1 | 8/2009 | Chalfant et al. | |
| 2009/0268946 A1 | 10/2009 | Zhange et al. | |
| 2010/0192110 A1 | 7/2010 | Carter et al. | |
| 2010/0201894 A1 | 8/2010 | Nakayama et al. | |
| 2010/0253493 A1 | 10/2010 | Seder et al. | |
| 2010/0253601 A1* | 10/2010 | Seder et al. | 345/7 |
| 2010/0274480 A1 | 10/2010 | McCall et al. | |
| 2010/2533492 | 10/2010 | Seder et al. | |
| 2010/0292886 A1 | 11/2010 | Szczerba et al. | |
| 2010/0332266 A1* | 12/2010 | Tamir et al. | 705/4 |
| 2011/0018903 A1 | 1/2011 | Lapstun et al. | |
| 2011/0022393 A1 | 1/2011 | Wäller et al. | |
| 2011/0052042 A1 | 3/2011 | Tzvi | |
| 2011/0075257 A1 | 3/2011 | Hua et al. | |
| 2011/0093190 A1 | 4/2011 | Yoon | |
| 2011/0106428 A1 | 5/2011 | Park et al. | |
| 2011/0199376 A1 | 8/2011 | Saleman | |
| 2011/0251768 A1 | 10/2011 | Luo et al. | |
| 2012/0019557 A1 | 1/2012 | Aronsson et al. | |
| 2012/0041632 A1 | 2/2012 | Bordes | |
| 2012/0072105 A1 | 3/2012 | Feyereisen et al. | |
| 2012/0154441 A1 | 6/2012 | Kim | |
| 2012/0162255 A1 | 6/2012 | Ganapathy et al. | |
| 2012/0173069 A1 | 7/2012 | Tsimhoni et al. | |
| 2012/0212405 A1 | 8/2012 | Newhouse et al. | |
| 2012/0224060 A1 | 9/2012 | Gurevich et al. | |
| 2012/0249589 A1 | 10/2012 | Gassner et al. | |
| 2012/0283942 A1 | 11/2012 | T'Siobbel et al. | |
| 2012/0310531 A1 | 12/2012 | Agarwal et al. | |
| 2013/0050258 A1 | 2/2013 | Liu et al. | |
| 2013/0083291 A1 | 4/2013 | Smithwick et al. | |
| 2013/0151145 A1 | 6/2013 | Ishikawa | |
| 2013/0261871 A1 | 10/2013 | Hobbs et al. | |
| 2013/0262997 A1 | 10/2013 | Markworth et al. | |
| 2014/0005857 A1 | 1/2014 | Heisterkamp | |
| 2014/0019913 A1 | 1/2014 | Newman et al. | |
| 2014/0063064 A1 | 3/2014 | Seo et al. | |
| 2014/0114845 A1 | 4/2014 | Rogers et al. | |
| 2014/0139524 A1 | 5/2014 | Nilsson et al. | |
| 2014/0267263 A1* | 9/2014 | Beckwith et al. | 345/424 |
| 2014/0267398 A1 | 9/2014 | Beckwith et al. | |

FOREIGN PATENT DOCUMENTS

| | | |
|---|---|---|
| DE | 102009045169 | 3/2011 |
| EP | 1862988 | 11/2009 |
| EP | 2618108 | 7/2013 |
| JP | 2006309552 | 11/2006 |
| WO | 2010040589 | 4/2010 |
| WO | 2011108091 | 9/2011 |

OTHER PUBLICATIONS

Website: "BWM Technology Guide: Adaptive Brake Assistant" http://www.bmw.com/com/en/insights/technology/technology_guide/articles/adaptive_brake_assistant.html, printed Oct. 17, 2014.

Website: "Adaptive Cruise Control and Collision Warning with Brake Support" http://corporate.ford.com/doc/Adaptive_Cruise.pdf, Jul. 2012.

Article: Alves, P.R. et al. "Forward Collision Warning Systems Using Heads-up Displays: Testing Usability of Two New Metaphors", Intelligent Vehicles Symposium (IV), 2013 IEEE, pp. 1-6, http://ueeexplore/ieee.org/xpl/login.jsp?tp=&arnumber=6629438 &url=htp%3A%2F%2ieeexplore.ieee.org%2Fstamp%2Fstamp. jsp%3Ftp%3D.%26arnumber%3D6629438.

Article: Ho, C. et al. "Multisensory In-Car Warning Signals for Collision Avoidance" Human Factors: The Journal of the Human Factors and Ergonomics Society, 49(6), 1107-1114, Dec. 2007, http://www.ncbi.nlm.nih.gov/pubmed/18074709.

Article: Gray R. et al. "A Comparison of Different Informative Vibrotactile Forward Collision Warnings: Does the Warning Need to Be Linked to the Collision Event?", PloS One, 9(1), e87070, Jan. 27, 2014, http://www.plosone.org/article/info%3Adoi%2F10. 1371%2Fjournal.pone.0087070.

Article: Tai et al. "Bridging the Communication Gap: A Driver-Passenger Video Link" dated Apr. 15, 2010, https://www.pervasive. wiwi.uni-due.de/uploads/tx_itochairt3/publications/Bridging_the_Communication_Gap-MC2009-GraceTai_01.pdf.

Website: "Future Car Technologies" dated Dec. 19, 2013, http://www.carcoversdirect.com/car-lovers-resources/fact-friday/future-car-technologies/#.U3uVbPldVJ1.

Office Action of U.S. Appl. No. 14/041,614 dated Dec. 23, 2014.

Autoblog, GM's Full-Windshield HUD Technology | Autoblog, YouTube, Mar. 17, 2010, http://www.youtube.com/watch?v=wR5EAGM4-U&feature=youtu.be&t=1m15s.

MVS California, 2_Working_Demo.mov, YouTube, May 16, 2011, http://www.youtube.com/watch?v=pdtcyaF6bTl.

Office Action of U.S. Appl. No. 13/832,918 dated Jan. 2, 2015.

Office Action of U.S. Appl. No. 14/041,614 dated May 6, 2015.

Office Action of U.S. Appl. No. 14/041,614 dated Aug. 6, 2015, 21 pages.

Office Action of U.S. Appl. No. 14/321,105 dated Sep. 24, 2015, 37 pages.

Office Action of U.S. Appl. No. 14/465,049 dated Nov. 19, 2015, 63 pages.

* cited by examiner

DRIVER TRAINING SYSTEM USING HEADS-UP DISPLAY AUGMENTED REALITY GRAPHICS ELEMENTS

BACKGROUND

Driving can seem less dangerous than it really is. Paradoxically, most drivers believe they are better than average at driving. In fact, many drivers may routinely behave badly while driving because the behavior goes uncorrected. However, any mistake made while driving has the potential to lead to a collision or other dangerous circumstance.

Generally, driver behavior is safest when the driver is engaged and not distracted. However, a typical commuter situation may foster driver disengagement and distraction. While commuting, the driver may have a low level of stimulation, little investment in the outcome of a routine task, no reward for good driving behavior. Furthermore, there is generally no feedback on the driver's performance other than the bare minimum base-line of not wrecking their vehicle. Therefore, while commuting a driver may enter a state of malaise and be more likely to be distracted by any task the driver finds more engaging.

BRIEF DESCRIPTION

According to one aspect, a driver training system includes a training controller and a heads-up display device. The training controller is configured to determine a driving cue based on inputs received from a control system of an associated vehicle related to an operational state of the associated vehicle and an environment surrounding the associated vehicle. The heads-up display device is configured to present the driving cue as an augmented reality graphic element in view of a driver of the associated vehicle by projecting graphic elements on a windshield of the associated vehicle.

According to another aspect, a driving cue adherence controller for use with a driver training system includes at least one processor. The at least one processor is configured to receive inputs related to an operational state of an associated vehicle and an environment surrounding the associated vehicle, and to receive inputs related to a driving cue presented to a driver of the associated vehicle as an augmented reality graphic element that instructs a driving behavior. The at least one processor is also configured to continuously determine a current level of adherence to the driving cue presented to the driver based on the received inputs of the operational state of the associated vehicle, the environment surrounding the associated vehicle, and the driving cue presented to the associated vehicle, and to continuously determine an aggregate level of adherence to the driving cue based on the continuously determined current level of adherence to the driving cue at each of a plurality of time points over a predetermined time period.

According to yet another aspect, a driver training method includes presenting a driving cue which instructs a driving behavior to a driver as an augmented reality graphic element through a heads-up display device. The method further includes continuously determining a current level of adherence to the driving cue presented to the driver by monitoring a variance between the instructed driving behavior and an actual driving behavior, and continuously determining an aggregate level of adherence to the driving cue presented to the driver based on the current level of adherence to the driving cue determined over a predetermined time period. The method also includes presenting the aggregate level of adherence to the driving cue to the driver as an augmented reality graphic element separate from the driving cue through the heads-up display device.

DETAILED DESCRIPTION

Figure 1:
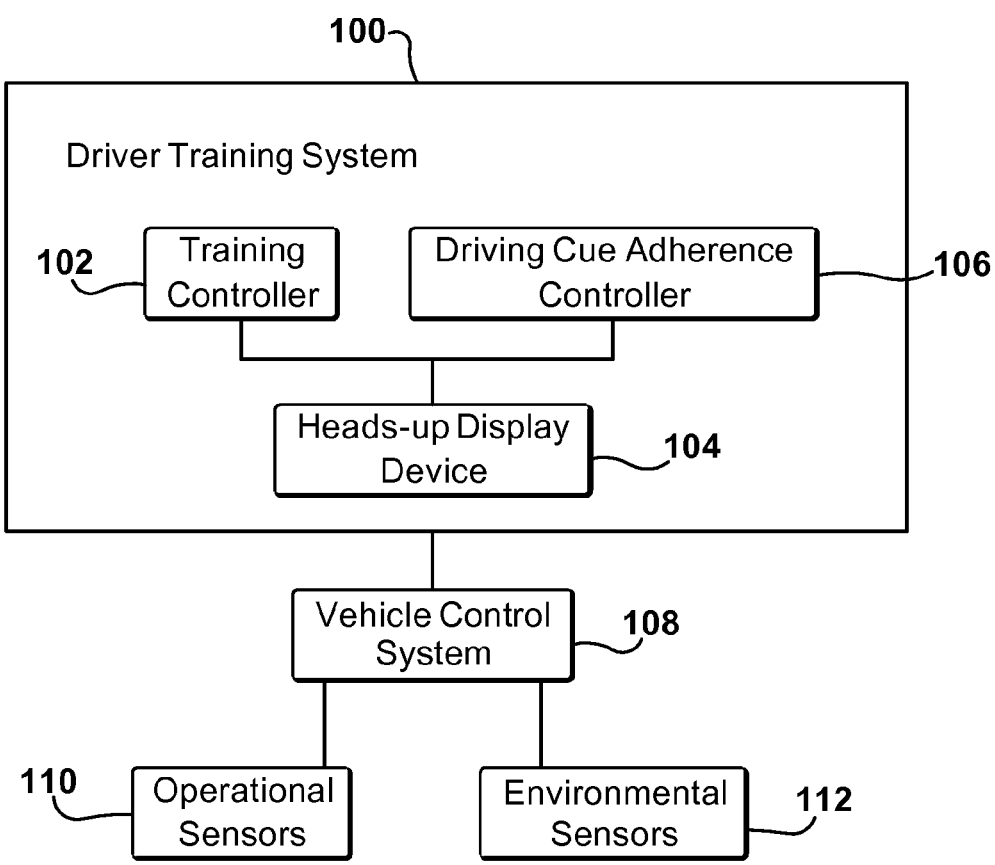
FIG. 1 is a block schematic illustrating a driver training system in communication with a vehicle control system.

Referring to FIG. 1, a driver training system 100 which uses heads-up display (hereinafter, "HUD") augmented reality graphic elements is shown. The driver training system 100 includes a training controller 102, a heads-up display device 104 (hereinafter, "HUD device 104"), and a driving cue adherence controller 106 (hereinafter, "adherence controller 106"). Generally, the training controller 102 is configured to determine a driving cue to be presented to a driver of a vehicle, the HUD device 104 is configured to present the driving cue as an augmented reality graphic element in view of the driver, and the adherence controller 106 is configured to continuously determine current and aggregate levels of adherence to the driving cue presented to the driver.

The driver training system 100 is configured to be provided in an associated vehicle (not shown) which includes at least one vehicle control system 108 (control system). The vehicle control system 108 includes and/or communicates with at least one operational sensor 110 (hereinafter, "operational sensors 110") and at least one environmental sensor 112 (hereinafter, "environmental sensors 112). The driver training system 100 communicates with the vehicle control system 108 so as to receive inputs related to an operational state of the vehicle and an environment surrounding the vehicle, and the training controller 102 determines the driving cue to be presented to the driver based on the received inputs. The vehicle control system 108 may directly transmit the inputs received from the operational sensors 110 and the environmental sensors 112, or the vehicle control system 108 may perform some processing through inputs from the operational sensors 110 and the environmental sensors 112, and communicate a result of the processing.

The vehicle control system 108 may take the form of one or more processors (arithmetic processors), computers, or any other elements which are configured or programmed to perform vehicle controlling functions. Various vehicle controlling functions are known, and the vehicle control system 108 may be configured to perform any of the known vehicle controlling functions. Certain specific vehicle controlling functions which are associated with the system 100 are described below, though it is to be appreciated that the below-described vehicle functions are not intended to be an exhaustive listing of vehicle control functions which are or may be performed by the vehicle control system 108. The processing performed by the vehicle control system 108 in performing the vehicle controlling functions are generally considered to be known, and will only be described below as relevant to the driver training system 100.

The vehicle control system 108 may perform the vehicle controlling functions based on inputs received from the operational sensors 110, the environmental sensors 112, and/or other sensors or systems. The operational sensors 110 and environmental sensors 112 may take the form of any known sensors which are capable of sensing or detecting information related to an operational state of the vehicle and an environment surrounding the vehicle, respectively. For example, the operational sensors 110 may include any sensors capable of detecting or sensing a vehicle speed of travel, a vehicle position, a vehicle acceleration, etc. The environmental sensors 112 may include any sensors capable of detecting a presence and position of other vehicles surrounding the vehicle, a presence and position of potential obstacles (e.g., pedestrians) in a roadway, a presence and position of a path at which the vehicle must or should yield a right of way, etc.

The operational sensors 110 and environmental sensors 112 capable of performing the above-noted functions are considered to be known, and will therefore not be described in detail herein. However, it is to be appreciated that certain of the above-listed functions may also be performed using mechanisms other than the operational sensors 110 and environmental sensors 112. For example, the vehicle control system 108 may include a GPS system and/or map database which may be used to identify, for example, the vehicle speed of travel, the vehicle position, the vehicle acceleration, the presence and position of the path at which the vehicle must or should yield the right of way, etc.

With reference to the driver training system 100, the vehicle control system 108 receives information related to the operational state of the vehicle and the environment surrounding the vehicle, and, in conjunction with the training controller 102, determines one or more (i.e., a plurality of) driving cues that instruct a driving behavior. In this regard, the vehicle control system 108 may determine the driving cue and communicate information regarding the driving cue to the training controller 102. Alternatively, the vehicle control system 108 may communicate the operational state information and information regarding the environment surrounding the vehicle to the training controller 102, which determines the driving cue based on the received inputs. As a further alternative, some combination of the vehicle control system 108 and the training controller 102 may cooperate to determine the driving cue and/or the information regarding the driving cue.

The training controller 102 may take the form of one or more processors (arithmetic processors), computers, or any other elements which are configured or programmed to receive inputs from the vehicle control system 108 and to determine the at least one driving cue that instructs driving behavior based on the received inputs from the vehicle control system 108. The training controller 102 may be configured to determine a type of driving cue, specific features of the driving cue, a position of the driving cue, an orientation of the driving cue, etc.

While various types of driving cues may be used with the herein-described driver training system 100 to instruct various driving behaviors, the instant disclosure describes three driving cues that instruct three associated driving behaviors. Particularly, the instant disclosure describes the following driving cues that instruct the following driving behaviors: a vehicle surrounding driving cue that instructs driving behavior to reduce a number of other vehicles in an immediate vicinity of the vehicle; a merging driving cue that instructs driving behavior to follow a desired merging path and to travel at a desired merging speed when merging onto a roadway; and a yielding driving cue that instructs driving behavior to yield a right of way at a particular path. It is to be appreciated that the system 100 described herein is amenable for use with only a subset of these driving cues (and associated instructed driving behaviors), as well as with additional or different driving cues (and associated instructed driving behaviors).

The driving cue determined by the training controller 102 is communicated to the HUD device 104, which is configured to present the driving cue as an augmented reality graphic element in view of the driver of the vehicle. In this regard, the training controller 102 may be configured to control the HUD device 104 to present the driving cue, or the HUD device 104 may include a HUD controller (not shown) which receives an input related to the driving cue from the training controller 102 and controls the HUD device 104 to present the driving cue.

Figure 2:
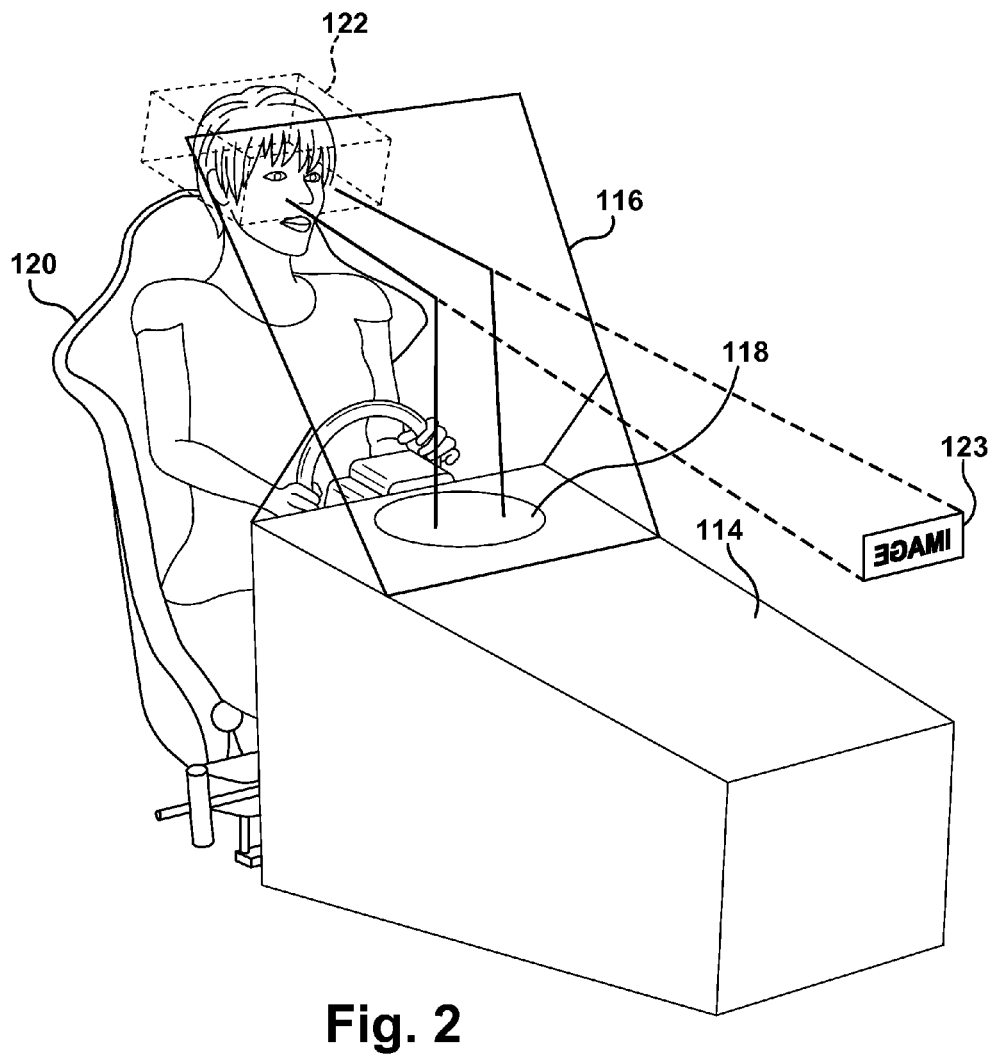
FIG. 2 is a schematic illustration of a vehicle in which the vehicular heads-up display system is provided.

The HUD device 104 may take the form of any such device capable of projecting the driving cues determined by the training controller 102 as HUD augmented reality graphic elements, including contact-analog augmented reality graphic elements which are rendered to appear to the driver as being directly on the environment surrounding the vehicle. With reference to FIG. 2, the HUD device 104 may be provided in a dashboard HUD enclosure 114 of the vehicle, and configured to project graphic elements on a windshield 116 of the vehicle through a HUD enclosure exit aperture 118. The graphic elements are rendered to the driver as augmented reality graphic elements appearing in the environment as image 123 when the driver is seated in a driver seat 120 and the driver's eyes are in an eye box 122.

Furthermore, the HUD device 104 may be configured to present the augmented reality graphic elements on a ground-surface focal plane, a sky focal plane, and one or more frontal focal planes. The ground-surface focal plane is parallel to and substantially on a ground surface. The sky focal plane is parallel to and above the ground surface (i.e., above the vehicle). The frontal focal plane is oriented perpendicularly to the ground surface. The HUD device 104 may, for example, be that disclosed in the concurrently filed U.S. patent application titled "VOLUMETRIC HEADS-UP DISPLAY WITH DYNAMIC FOCAL PLANE", U.S. patent application Ser. No. 13/832,918, filed Mar. 15, 2013, the contents of which are hereby incorporated in full by reference.

The adherence controller 106 may take the form of one or more processors (arithmetic processors), computers, or any other elements which are configured or programmed to continuously determine a current level of adherence to the driving cue(s) presented to the driver, and an aggregate level of adherence to the driving cue(s) presented to the driver. In this regard, the adherence controller 106 communicates with the training controller 102 and/or the vehicle control system 108 (i.e., receives inputs from the training controller 102 and/or the vehicle control system 108) to determine an actual driving behavior and a variance between the driving behavior instructed by the driving cue and the determined actual driving behavior. The adherence controller 106 then determines the current level of adherence to the driving cue presented to the driver based on the determined variance. The variance may be determined as a positional variance, a speed variance, and/or an environmental variance from a position, speed, and/or environment instructed by the driving cue.

The adherence controller 106 continuously or iteratively (hereinafter referenced as being continuously) determines the current level of adherence to the driving cue over a predetermined time period, and continuously or iteratively (hereinafter referenced as being continuously) determines the aggregate level of adherence to the driving cue based on the continuously or iteratively determined current level(s) of adherence to the driving cue over the predetermined time period. The predetermined time period may include at least one of: a time period beginning at a most recent power-on of the vehicle and continuing to a current time; a time period beginning at a first power-on of the vehicle and continuing to the current time (i.e., a time period covering a life of the vehicle); and a time period beginning at a resetting of the driver training system 100 and continuing to the current time. In this regard, the driver training system 100 may provide a mechanism, such as an actual or virtual button, which may be pressed or otherwise actuated to reset a start point of the predetermined time period.

The aggregate level of the adherence to the driving cue(s) may be determined as a time-average of the determined current level adherence to the driving cue over the predetermined time period. Alternatively, the aggregate level of the adherence to the driving cue(s) may be determined using any other method so as to reflect an overall adherence to the driving cue(s).

The adherence controller 106 communicates one or both of the continuously determined current level of adherence and the continuously determined aggregate level of adherence to the HUD device 104, which presents one or both of the continuously determined current level of adherence and aggregate level of adherence to the driving cue in view of the driver. The continuously determined current level of adherence and/or aggregate level of adherence may be presented to the driver as an augmented reality graphic element, which may be separate from the driving cue associated therewith.

Additional details of the driver training system 100 are provided below with reference to the following driving cues that instruct the following driving behaviors: the vehicle surrounding driving cue that instructs driving behavior to reduce the number of other vehicles in the immediate vicinity of the vehicle; the merging driving cue that instructs driving behavior to follow the desired merging path and to travel at the desired merging speed when merging onto the roadway; and the yielding driving cue that instructs driving behavior to yield the right of way at a particular path. The driver training system 100 may be configured to present any one or more of the above-listed driving cues, separately or simultaneously.

Figure 3:
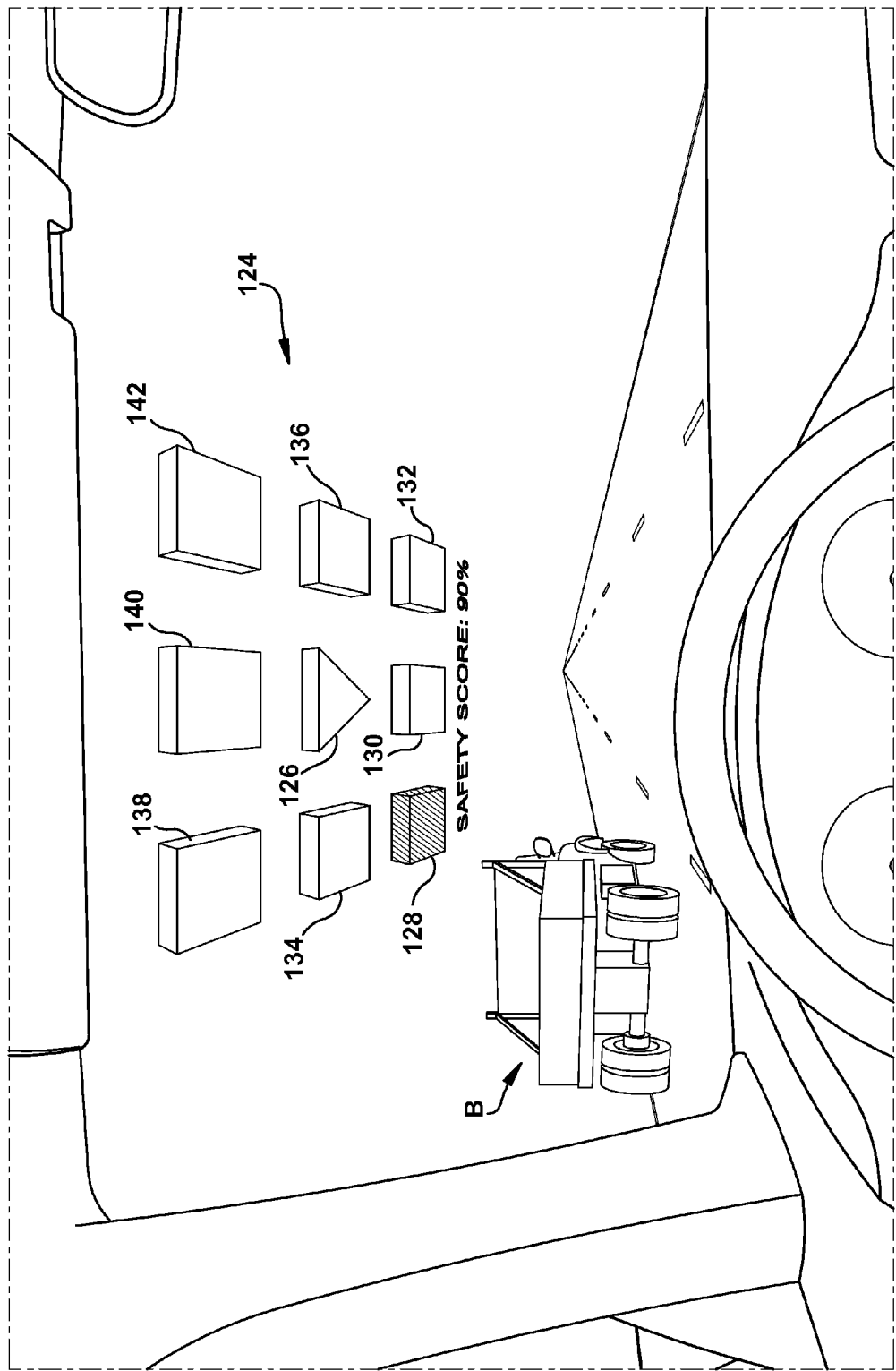
FIG. 3 illustrates a point of view of a driver looking through a windshield of a vehicle while a vehicle surrounding grid driving cue is presented as a heads-up, augmented reality graphic element.
Figure 4:
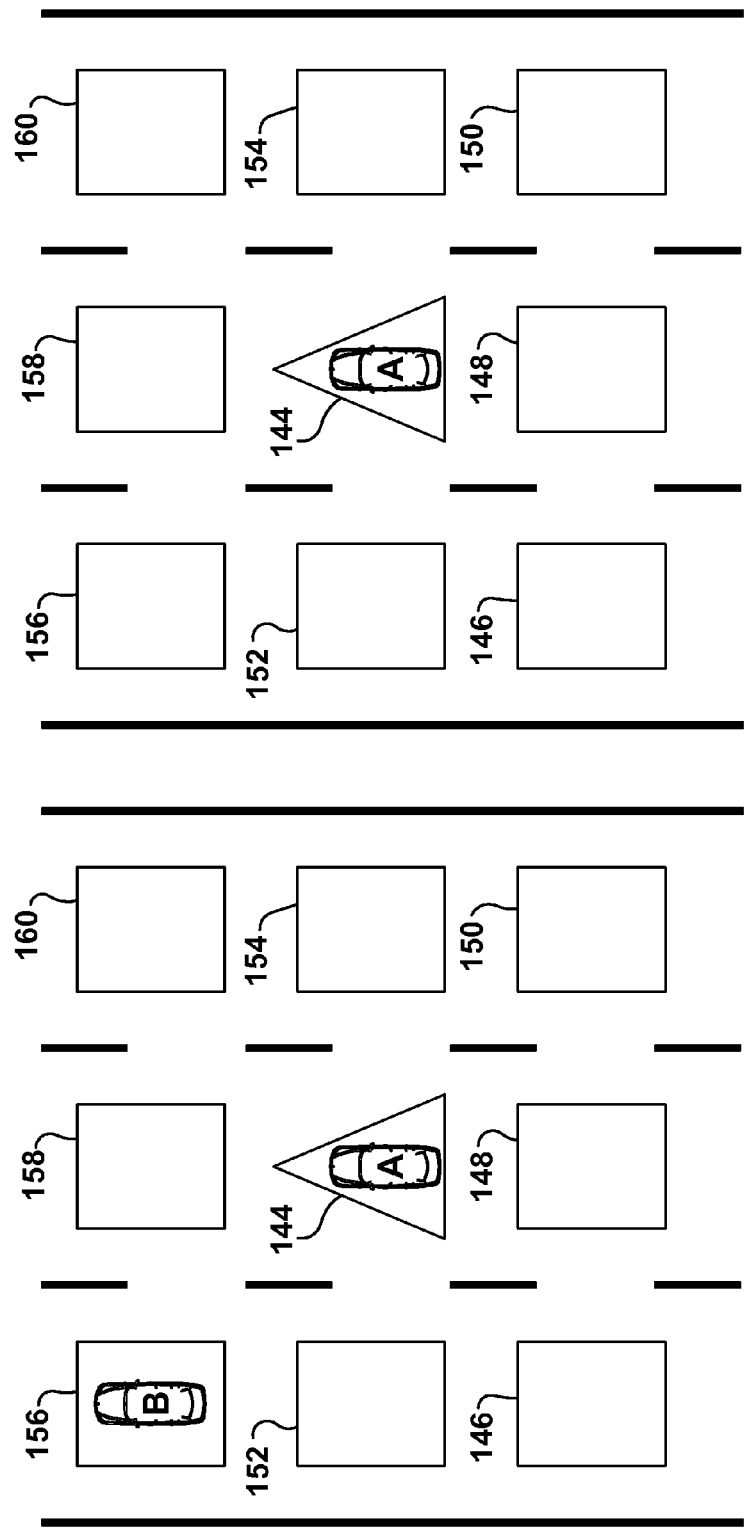
FIGS. 4A and 4B are schematic illustrations showing a determination of the vehicle surrounding grid driving cue.

Referring to FIGS. 3, 4A, and 4B, the vehicle surrounding driving cue may be provided using a vehicle surrounding grid 124 which is projected by the HUD device 104 as an augmented reality graphic element appearing in view of the driver on the sky focal plane in front of the vehicle. As is described in further detail below, the vehicle surrounding grid 124 provides a driving cue that instructs driving behavior to reduce the number of vehicles in an immediate vicinity of the vehicle. The vehicle surrounding grid 124 includes a vehicle representative marker 126 and a plurality of surrounding markers 128-142 which surround the vehicle representative marker 126.

The vehicle representative marker 126 represents the vehicle and/or a region of the environment in which the vehicle is located, hereinafter referenced as "vehicle region 144" (see FIGS. 4A and 4B). Each of the plurality of surrounding markers 128-142 represents a unique region 146-160 surrounding the vehicle and/or vehicle region 144. As described herein, the plurality of surrounding markers 128-142 include eight surrounding markers, hereinafter referenced as: first surrounding marker 128, second surrounding marker 130, third surrounding marker 132, fourth surrounding marker 134, fifth surrounding marker 136, sixth surrounding marker 138, seventh surrounding marker 140, and eighth surrounding marker 142. Consequently, there are eight unique regions 146-160, hereinafter referenced as: first region 146, second region 148, third region 150, fourth region 152, fifth region 154, sixth region 156, seventh region 158, and eighth region 160. The eight surrounding markers 128-142 are each associated with a unique one of the eight regions 146-160 as follows: the first surrounding marker 128 represents the first region 146; the second surrounding marker 130 represents the second region 148; the third surrounding marker 132 represents the third region 150; the fourth surrounding marker 134 represents the fourth region 152; the fifth surrounding marker 136 represents the fifth region 154; the sixth surrounding marker 138 represents the sixth region 156; the seventh surrounding marker 140 represents the seventh region 158; and the eighth surrounding marker 142 represents the eighth region 160.

The first region 146 is located behind and to the left of the vehicle (i.e., vehicle region 144), the second region 148 is located immediately behind the vehicle (i.e., vehicle region 144), the third region 150 is located behind and to the right of the vehicle (i.e., vehicle region 144), the fourth region 152 is located to the left of the vehicle (i.e., vehicle region 144), the fifth region 154 is located to the right of the vehicle (i.e., vehicle region 144), the sixth region 156 is located to a front left side of the vehicle (i.e., vehicle region 144), the seventh region 158 is located immediately in front of the vehicle (i.e., vehicle region 144), and the eighth region 160 is located to a front right side of the vehicle (i.e., vehicle region 144). Accordingly, the first to eighth regions 146-160 surround the vehicle region 144. It is to be appreciated that the plurality of unique regions 146-160 may include fewer or greater than eight regions, and may only partially surround the vehicle (i.e., vehicle region 144). The first to eighth regions 146-160 may be considered to correspond to an immediate vicinity of the vehicle.

A size of each of the first to eighth regions 146-160 may be determined, experimentally or otherwise, to cover an area surrounding the vehicle in which other vehicles may be considered to pose an immediate risk to the vehicle via movement of the other vehicles or movement of the vehicle. For example, the first to third regions 146-150 may pose a risk to the vehicle when the vehicle changes lanes, veers into another lane, or suddenly brakes. Other vehicles in the fourth and fifth regions 152, 154 may pose a risk to the vehicle by either changing lanes into a lane in which the vehicle is traveling, veering into the vehicle's lane, or by the vehicle changing lanes or veering into lanes associated with the fourth and fifth regions 152, 154. Other vehicles located in the sixth to eighth regions 156-160 may pose a risk to the vehicle by veering into the lane in which the vehicle is traveling or by suddenly braking.

In operation, the vehicle control system 108 receives inputs from, e.g., the environmental sensors 112 related to the existence of other vehicles in each of the unique first to eighth regions 146-160. In this regard, the environmental sensors 112 detect the presence of other vehicles in each of the surrounding regions 146-160, and communicate the detection to the vehicle control system 108. The manner in which other vehicles in the immediate vicinity of the vehicle are detected by the environmental sensors 112 and/or the vehicle control system 108 is considered to be known, and will therefore not be described in detail herein. It is considered that any manner of detecting other vehicles in the immediate vicinity of the vehicle is amenable for use with the herein-described driver training system 100.

The information regarding whether each of the surrounding regions 146-160 is occupied by another vehicle is used by the vehicle control system 108 and/or the training controller 102 to determine the vehicle surrounding grid 124 which is presented to the driver. Specifically, the vehicle surrounding grid 124 presented to the driver is determined such that the surrounding markers 128-142 associated with the region(s) 146-160 occupied by another vehicle are highlighted. The surrounding markers 128-142 associated with the region(s) 128-142 not occupied (vacant) by another vehicle are dimmed (i.e., not highlighted).

For example, FIGS. 3 and 4A illustrate a scenario in which another vehicle B is in the sixth region 156, to the front right side of the vehicle A and the vehicle region 144. Accordingly, the vehicle surrounding grid 124 is determined to have the sixth surrounding marker 128, which is associated with the sixth region 156, highlighted. The first to fifth, seventh, and eighth surrounding markers 128-136, 140, 142, which are associated with the vacant first to fifth, seventh, and eighth regions 146-154, 158, 160 are dimmed or not highlighted.

The vehicle surrounding grid 124 notifies the driver of the existence and position of other vehicles surrounding the vehicle, such that the driver is aware of safe areas to which evasive maneuvering may be carried out (i.e., those areas in which other vehicles are not located). Since the vehicle surrounding grid 124 is presented to the driver as an augmented reality graphic element which is rendered in the environment viewed by the driver, the driver does not need to take his/her eyes off of the road to view the vehicle surrounding grid 124, nor does the driver have to adjust focus between an element displayed on an instrument panel and/or the windshield (i.e., as may be the case with HUD graphic elements presented on the windshield).

In addition to notifying the driver of the existence and position of other vehicles surrounding the vehicle, the vehicle surrounding grid 124 instructs driving behavior to reduce the number of other vehicles in the immediate vicinity (e.g., in the regions 146-160) of the vehicle (i.e., vehicle region 144). In this regard, a relatively safest driving occurs when no other vehicles are in the immediate vicinity of the vehicle (i.e., when all of the regions 146-160 are vacant). The vehicle surrounding grid 124 notifies the driver of the existence and position of other vehicles in the immediate vicinity of the vehicle, and encourages the driver to reduce the number of other vehicles in the immediate vicinity of the vehicle. Over time, the vehicle surrounding grid 124 trains the driver to always drive so as to reduce the number of other vehicles in the immediate vicinity of the vehicle, thereby training the driver to drive in a relatively safer manner.

To further encourage the driving behavior instructed by the vehicle surrounding grid 124 (i.e., to reduce the number of other vehicles in the immediate vicinity of the vehicle), the adherence controller 106 continuously determines the current and aggregate level of adherence to the driving cue provided by the vehicle surrounding grid 124 (the vehicle surrounding grid driving cue). The current level of adherence to the vehicle surrounding grid driving cue may be determined as a numerical score based on a percentage of dimmed or not highlighted surrounding markers 126-142 over a total number of surrounding markers 126-142. In the example shown in FIG. 3, the current level of adherence to the vehicle surrounding grid driving cue would be determined as 87.5%. Accordingly, the current level of adherence to the vehicle surrounding grid driving cue increases as a percentage of the surrounding markers 126-142 which are highlighted decreases (i.e., as the number of the regions 146-160 occupied by other vehicles decreases).

Other factors may be considered when determining the current level of adherence to the vehicle surrounding grid driving cue. For example, the score calculation may be weighted for certain of the regions 146-160 and surrounding markers 128-142. In this regard, it may be considered relatively more important to avoid having other vehicles in the second and seventh regions 148, 158. Accordingly, these regions may be given an elevated weighting. For example, the second and seventh regions 148, 158 may be worth twenty percentage points each, while the remaining six (first, third, fourth, fifth, sixth, and eighth) regions 146, 150, 152, 154, 156, 160 may be worth ten percentage points each. Using the weighted scores, in the example shown in FIG. 3 the current level of adherence to the vehicle surrounding grid driving cue would be determined as 90%. If the other vehicle B were located in either of the second region 148 or the seventh region 158, the current level of adherence to the vehicle surrounding grid driving cue would be determined as 80%. It is to be appreciated that the weighting may be applied in a different manner while remaining within the scope of the instant disclosure.

The adherence controller 106 is also configured to continuously determine an aggregate level of adherence to the vehicle surrounding grid driving cue. The aggregate level of adherence to the vehicle surrounding grid driving cue may be determined by taking the time-average of the current levels of adherence to the vehicle surrounding grid driving cue over a predetermined time period. This determination will be illustrated using an example in which the predetermined time period covers a one-hour trip, and the current levels of adherence to the vehicle surrounding grid driving cue during that one-hour trip are: 30 minutes at 100%; 15 minutes at 90%; and 15 minutes at 80%. The aggregate level of adherence to the vehicle surrounding grid driving cue is then determined to be 92.5% ([0.5×100]+[0.25×90]+[0.25×80]). It is to be appreciated that the aggregate level of adherence to the vehicle surrounding grid driving cue may be determined using other methodologies, based on the current levels of adherence to the vehicle surrounding grid driving cue over the predetermined time period (or some other time period).

The adherence controller 106 may communicate the current and/or aggregate levels of adherence to the vehicle surrounding grid driving cue to one or both of the training controller 102 and the HUD device 104 such that either or both of the current and aggregate levels of adherence to the vehicle surrounding grid driving cue may be presented to the driver by the HUD device 104. The current and/or aggregate levels of adherence to the vehicle surrounding grid driving cue may be presented as augmented reality graphic elements separate from the vehicle surrounding grid 124 by the HUD device 104 projecting graphic elements on the windshield 116 of the vehicle. As shown in FIG. 3, only the aggregate level of adherence to the vehicle surrounding grid driving cue is presented to the driver by the HUD display device 104 at 162.

By presenting the vehicle surrounding grid 124 and the continuously determined aggregate level of adherence to the vehicle surrounding grid driving cue, the driver is provided with both instantaneous and cumulative feedback related to the instructed driving behavior. The driver is therefore encouraged to set and engage in a safe driving goal for reducing the number of other vehicles in the immediate vicinity of the vehicle, and the driver's engagement in the goal is increased. By increasing the driver's engagement, the driver training system 100 may thereby prevent driver malaise. Additionally, since the vehicle surrounding grid 124 and the aggregate level of adherence to the vehicle surrounding grid driving cue are presented as augmented reality graphic elements, the driver does not need to look away from the road or adjust his/her focus to view the vehicle surrounding grid 124 and the aggregate level of adherence to the vehicle surrounding grid driving cue. Consequently, driver distraction may also be reduced as compared with the use of instrument panel displays and/or HUDs which project graphic elements onto a windshield.

Returning to the example shown in FIGS. 3 and 4A, the driver views the vehicle surrounding grid 124 and the aggregate level of adherence to the vehicle surrounding grid driving cue. To improve the aggregate level of adherence to the vehicle surrounding grid driving cue, the driver is encouraged/instructed to remove the other vehicle B from the immediate vicinity of the vehicle. Therefore, the driver is encouraged/instructed to, e.g., slow down such that the other vehicle B is no longer in the immediate vicinity of the vehicle (i.e., no longer in the sixth region 156), as shown in FIG. 4B. The vehicle surrounding grid 124 associated with the scenario shown in FIG. 4B has no other vehicles in the regions 146-160 and, therefore, none of the surrounding markers 126-142 highlighted, such that the current level of adherence to the vehicle surrounding grid driving cue is determined to be 100%.

Figure 5:
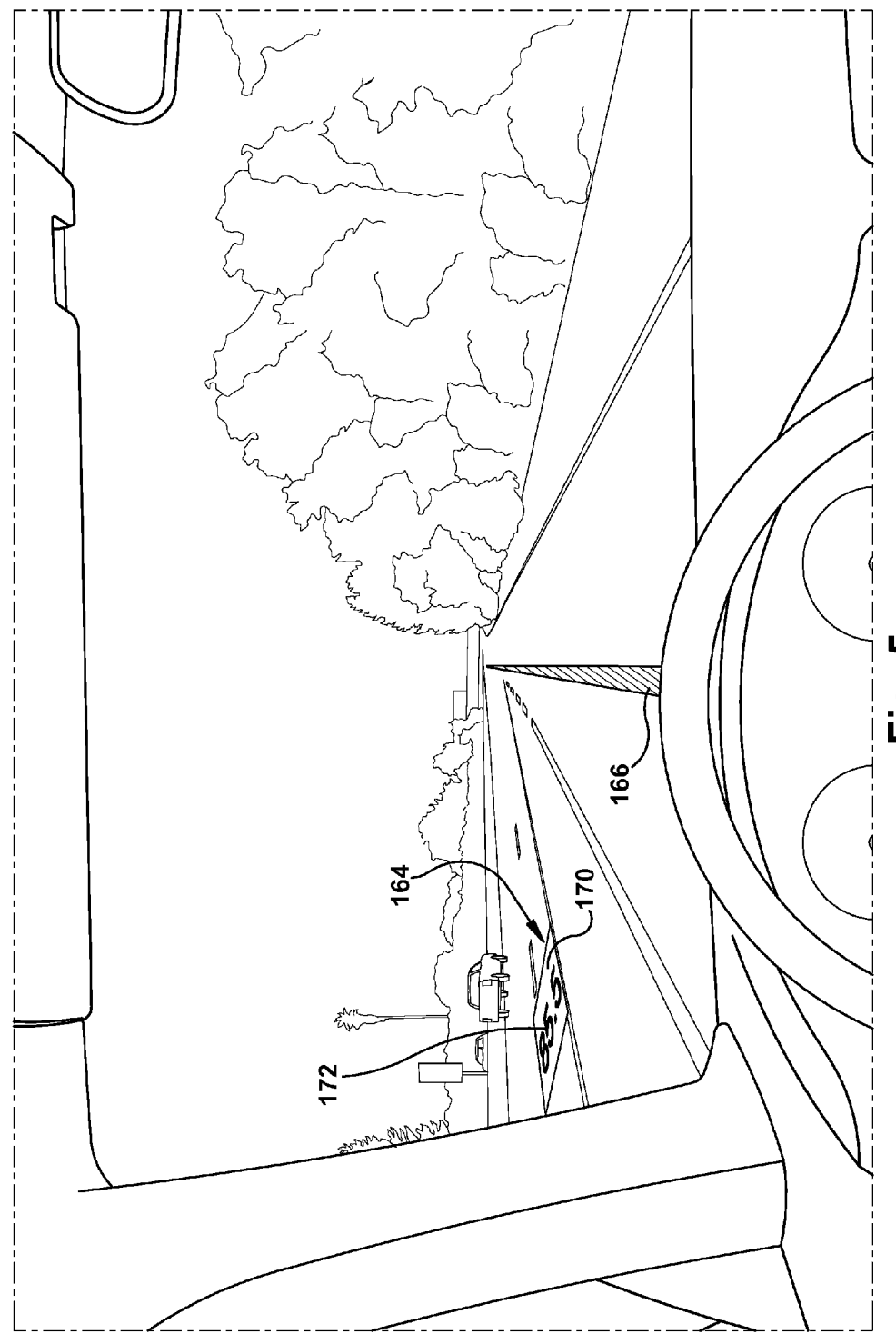
FIG. 5 illustrates the point of view of the driver looking through the windshield of the vehicle while a merging guide driving cue is presented as a heads-up, contact-analog augmented reality graphic element.

Referring to FIG. 5, the merging driving cue may be provided using a merging guide 164 which is projected by the HUD device 104 as an augmented reality graphic element appearing in view of the driver on the ground-surface focal plane in front of the vehicle. As is described in further detail below, the merging guide 164 provides a driving cue that instructs driving behavior to follow a desired merging path and to travel at a desired merging speed when merging onto a roadway. The merging guide 164 includes a merging path line 166 and a merging speed marker 168 which moves along the merging path line 166. The merging path line 166 shows the driver a desired merging path to follow while merging onto the roadway, while the merging speed marker 168 moves along the merging path line 166 at the desired merging speed to show the driver the desired speed for merging onto the roadway.

In operation, the vehicle control system 108 may determine that the vehicle is merging onto a roadway using inputs from any of the operational sensors 110, the environmental sensors 112, and/or any other available mechanisms. For example, the vehicle control system 108 may be configured to determine that the vehicle is merging onto a roadway through communication with a GPS navigation system. Once the vehicle control system 108 determines that the vehicle is merging onto the roadway, the vehicle control system 108 and the training controller 102 may determine the desired merging path and the desired merging speed for the vehicle to follow while merging onto the roadway. The vehicle control system 108 communicates the desired merging path and desired merging speed to the training controller 102, which determines the merging guide 164 (i.e., the merging path line 166 and merging speed marker 168) based on the desired merging path and desired merging speed determined by the vehicle control system 108.

The vehicle control system 108 may determine the desired merging path and the desired merging speed for the vehicle to follow while merging onto the roadway in any manner. For example, the vehicle control system 108 may determine the desired merging path and the desired merging speed for the vehicle to follow while merging onto the roadway based on inputs received from, e.g., the environmental sensors 112 related to the existence, position, and travelling speed of other vehicles on the roadway onto which the vehicle is merging. The specific manner in which the vehicle control system 108 determines the desired merging path and the desired merging speed is considered to be known, and will therefore not be described in detail. It is to be appreciated that the training controller 102 may determine the desired merging path and/or the desired merging speed based, rather than or in conjunction with the vehicle control system 108.

Once the desired merging path and the desired merging speed for the vehicle to follow while merging onto the roadway are determined by the vehicle control system 108, this information is communicated to the training controller 102. The information of the desired merging path and the desired merging speed for the vehicle to follow while merging onto the roadway is considered to be information related to the operational state of the vehicle and the environment surrounding the vehicle. The training controller 102 then determines the merging path line 166 to be a line corresponding to the desired merging path determined by the vehicle control system 108. The training controller 102 also determines the merging speed marker 168 to be a marker which moves along the merging path line 166 at the desired merging speed.

The HUD device 104 is then made to present the merging path line 166 and merging speed marker 168 determined by the training controller 102 as contact-analog augmented reality graphic elements appearing on the road surface (i.e., the ground-surface focal plane) in front of the vehicle in view of the driver by projecting graphic elements on the windshield 116 of the vehicle. As noted above, the HUD device 104 may be controlled by the training controller 102 to present the merging path line 166 and merging speed marker 168, or the training controller 102 may communicate with the HUD device 104 (e.g., with a controller thereof) to transmit information related to the merging path line 166 and merging speed marker 168.

As shown in FIG. 5, the merging path line 166 is projected by the HUD device 104 so as to be rendered on the ground surface in view of the driver. The merging path line 166 presents the driver with the desired merging path to follow while merging onto the roadway. The merging speed marker 168 is also projected by the HUD device 104 so as to be rendered on the ground surface in view of the driver. The merging speed marker 168 is projected so as to move along the ground surface relative to the merging path line 166 so as to present the driver with a visual or graphic representation of the desired merging speed for merging onto the roadway, which the driver may use to pace the vehicle. The merging speed marker 168 may be presented to appear in the lane into which the driver is merging, as is shown in FIG. 5.

Accordingly, the merging guide 164 provides the merging driving cue that instructs driving behavior to follow the desired merging path and to travel at the desired merging speed when merging onto the roadway. The driver is thereby encouraged to merge onto the roadway while following the desired merging path and while traveling at the desired merging speed. In this regard, an incorrect, though common, driver tendency while merging onto a roadway is to slow down. However, it is relatively safer to quickly and smoothly speed up along an on-ramp so as to match traveling speeds on the roadway, pick a location in a closest lane with an open space between cars, and merge. The merging guide 164 trains the driver to accelerate smoothly and quickly and to locate a spot in a closest lane with an open space between cars while merging onto a roadway. The driver is thereby trained to drive in a relatively safer manner.

To further encourage the driving behavior instructed by the merging guide 164 (i.e., to follow the desired merging path and to travel at the desired merging speed when merging onto a roadway), the adherence controller 106 continuously determines the current and aggregate level of adherence to the driving cue provided by the merging guide 164 (the merging guide driving cue). The current level of adherence to the merging guide driving cue may be determined based on a positional variance of the vehicle from the merging path line 166 (i.e., from the desired merging path) and a speed variance of the associated vehicle from the merging speed marker 168 (i.e., from the desired merging speed). Particularly, the current level of adherence to the driving cue provided by the merging guide 166 may be determined to increase as the variance from the merging path line 166 and merging speed marker 168 decreases.

While various methods may be employed to determine the current level of adherence to the merging guide driving cue, the current level of adherence to the merging guide driving cue may be determined as a score out of 100 based on the following equation:

$$\text{Current Level of Adherence to the Merging Guide Driving Cue} = 100 \times \left[ W_V \left( 1 - \left( \frac{|V_D - V_{Curr}|}{V_D} \right) \right) + W_P \left( \frac{X_{max} - X_{Curr}}{X_{max}} \right) \right]$$

where $V_D$=Desired merging speed $V_{Curr}$=Current merging speed $X_{max}$=Predetermined maximum positional deviation from desired merging path line 166

$X_{Curr}$=Current positional deviation from desired merging path line 166

$W_V$=Weighting factor for speed variance $W_P$=Weighting factor for positional variance $W_V + W_P = 1.0$ Particularly, the adherence controller 106 communicates with at least one of the training controller 102 and the vehicle control system 108 to determine a current speed of travel of the vehicle, which is used as the current merging speed $V_{Curr}$. The current merging speed $V_{Curr}$ is compared to the desired merging speed $V_D$ determined by the vehicle control system 108 and/or the training controller 102 to determine the speed variance of the vehicle from the desired merging speed.

To determine the positional variance of the vehicle from the merging path line 166 (i.e., the desired merging path), the adherence controller 106 communicates with at least one of the training controller 102 and the vehicle control system 108 to determine a position of the vehicle. At least one of the adherence controller 106, the training controller 102, and the vehicle control system 108 then determine a distance between the position of the vehicle and the merging path line 166, which is used as $X_{Curr}$, the current positional deviation from desired merging path line 166. The current positional deviation $X_{Curr}$ is compared with a predetermined maximum positional deviation $X_{max}$ to determine a positional deviation factor. The predetermined maximum positional deviation $X_{max}$ may be determined as a maximum possible, feasible, or likely deviation from the merging path line 166.

Weighting factors $W_V$ and $W_P$ are then applied to the speed variance and positional deviation factor to determine a score for the current level of adherence to the merging guide driving cue. The weighting factors $W_V$, $W_P$ are applied to reflect a relative value of the speed variance and positional variance. In this regard, the speed variance may be considered relatively more important to safe driving than the positional variance. Therefore, the value of $W_V$ may be set higher than the value of $W_P$.

To illustrate the calculation of the current level of adherence to the merging guide driving cue, it will be assumed that the desired merging speed $V_D$ is 60 mph, the current merging speed $V_{Curr}$ is 54 mph, the current positional deviation $X_{Curr}$ from the desired merging path line 166 is 0.5 meters, the predetermined maximum positional deviation $X_{max}$ is 2 meters, and the weighting factors are set under an assumption that the speed variance is more important to safe driving than the positional variance, as follows: $W_V$=0.7, $W_P$=0.3. Using these values, the current level of adherence to the merging guide driving cue is determined to be 85.5. As the current merging speed $V_{Curr}$ approaches the desired merging speed $V_D$ (i.e., increases from 54 mph toward 60 mph) and/or the current positional deviation $X_{Curr}$ decreases (i.e., the position of the vehicle approaches the merging path line 166), the current level of adherence to the merging guide driving cue increases (and vice-versa).

The adherence controller 106 is also configured to continuously determine an aggregate level of adherence to the merging guide driving cue. The aggregate level of adherence to the merging guide driving cue may be determined by taking a time average of the current levels of adherence to the merging guide driving cue over a predetermined time period. This determination may be made in the same manner as that described above with respect to the determination of the aggregate level of adherence to the vehicle surrounding grid driving cue.

The adherence controller 106 may communicate the current and/or aggregate levels of adherence to the merging guide driving cue to one or both of the training controller 102 and the HUD display device 104 such that either or both of the current and aggregate levels of adherence to the merging guide driving cue may be presented to the driver by the HUD device 104. The current and/or aggregate levels of adherence to the merging guide driving cue may be presented as augmented reality graphic elements separate from or incorporated with the merging guide driving cue by the HUD device 104 projecting graphic elements on the windshield 116 of the vehicle.

As shown in FIG. 5, only the aggregate level of adherence to the merging guide driving cue is presented to the driver by the HUD device 104 at 172. Particularly, the aggregate level of adherence to the merging guide driving cue is presented on a background 170 of the merging speed marker 168 at 172. The aggregate level of adherence to the merging guide driving cue may alternatively be presented outside of the merging guide 164 (i.e., outside of the merging path line 166 and the merging speed marker 168), so as to be separate and at least minimally spaced from the merging guide 164.

By presenting the merging guide 164 and the continuously determined aggregate level of adherence to the merging guide driving cue, the driver is provided with both instantaneous and cumulative feedback related to the instructed driving behavior. The driver is therefore encouraged to set and engage in a safe driving goal for merging onto a roadway by following the desired merging path at the desired merging speed, and the driver's engagement in the goal is increased. By increasing the driver's engagement, the driver training system 100 may thereby prevent driver malaise. Additionally, since the merging guide 164 and the aggregate level of adherence to the merging guide driving cue are presented as augmented reality graphic elements, the driver does not need to look away from the road or adjust his/her focus to view the merging guide 164 and the aggregate level of adherence to the merging guide driving cue. Consequently, driver distraction may also be reduced as compared with the use of instrument panel displays and/or HUDs which project graphic elements onto a windshield.

Figure 6:
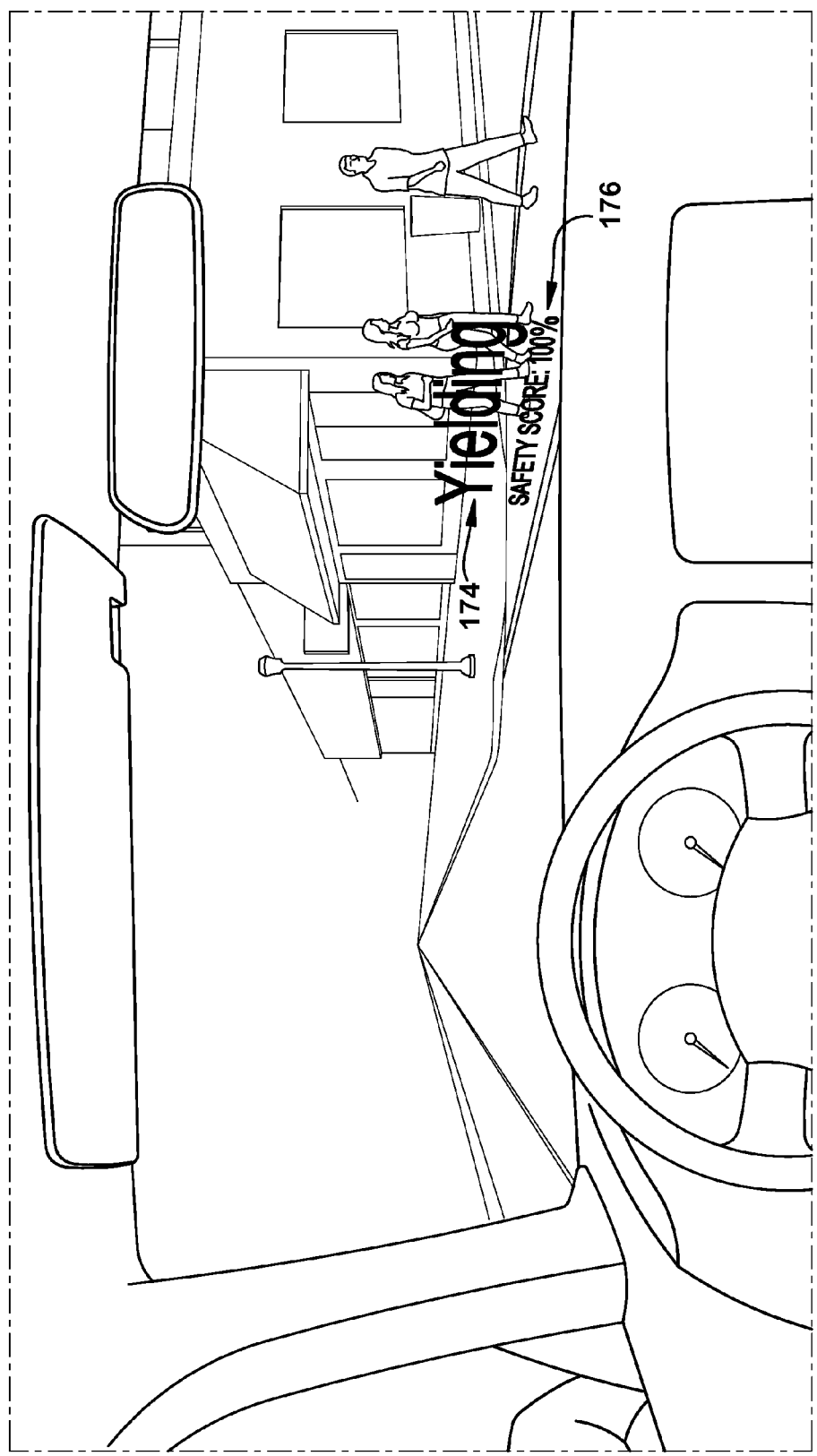
FIG. 6 illustrates the point of view of the driver looking through the windshield of the vehicle while a yield confirmation driving cue is presented as a heads-up, augmented reality graphic element.

Referring to FIG. 6, the yielding driving cue may be provided using a yield confirmation marker 174 which is projected by the HUD device 104 as an augmented reality graphic element appearing in view of the driver on at least one of the frontal focal planes in front of the vehicle. As is described in further detail below, the yield confirmation marker 174 provides a driving cue that instructs driving behavior to yield the right of way at a particular path or roadway. The yield confirmation marker 174 may be presented to cover at least a portion of the path at which the vehicle is to yield. The yield confirmation marker 174 may take the form of a sign, symbol, or word which acknowledges the driving behavior of yielding the right of way when appropriate.

In operation, the vehicle control system 108 receives inputs from, e.g., the environmental sensors 112 related to the presence, position, and orientation of a path at which the vehicle should yield the right of way. This information may also/alternatively be provided by communication with the GPS navigation system. Additionally, the environmental sensors 112 may be configured to identify pedestrians or other obstacles (e.g., animals, etc.) which are crossing a roadway or are about to cross the roadway, and to communicate such information to the vehicle control system 108.

The vehicle control system 108 may use this information to identify a path at which the vehicle should yield the right of way, and to determine a position and orientation at which the yield confirmation marker 174 is to be presented. Alternatively, the vehicle control system 108 may communicate the inputs received from the environmental sensors 112, GPS navigation system, etc., to the training controller 102, and the training controller 102 may identify the path at which the vehicle should yield the right of way and determine the position and orientation at which the yield confirmation marker 174 is to be presented. The manner in which the position and orientation of the yield confirmation marker 174 is determined is considered to be known, and will therefore not be discussed in detail herein.

The position and orientation of the yield confirmation marker 174 is either determined by the training controller 102 or communicated to the training controller 102, and the training controller 102 then determines the yield confirmation marker 174 to be at the determined position and orientation. Even if determined by the vehicle control system 108, the determined position and orientation of the yield confirmation marker 174 communicated to the training controller 102 from the vehicle control system 108 may be considered to be information related to the environment surrounding the vehicle. In addition to determining the yield confirmation marker 174 to be at the determined position and orientation, the training controller 102 may also determine a type of graphic element to display as the yield confirmation marker 174 (e.g., a sign, a different word, etc.)

The HUD device 104 is then made to present the yield confirmation marker 174 as an augmented reality graphic element at the determined position and orientation. Particularly, the HUD device 104 presents the yield confirmation marker as an augmented reality graphic element appearing in the frontal focal plane in view of the driver by projecting graphic elements on the windshield 116 of the vehicle. As noted above, the HUD device 104 may be controlled by the training controller 102 to present the yield confirmation marker 174, or the training controller 102 may communicate with the HUD device 104 (e.g., with a controller thereof) to transmit information related to the yield confirmation marker 174.

In the example shown in FIG. 6, pedestrians are identified as crossing an intersecting roadway on which the vehicle is going to pass. Accordingly, the intersecting roadway is identified as a path at which the vehicle is to yield the right of way. The yield confirmation marker 174 is determined by the training controller 102 to be the word "YIELDING". The position and orientation of the yield confirmation marker is determined by at least one of the vehicle control system 108 and the training controller 102 to be the position and orientation of an entrance to the intersecting roadway. Consequently, the training controller 102 determines the yield confirmation marker 174 to be the word "YIELDING" at the position and orientation which extends along and covers a portion of the entrance of the intersecting roadway. The HUD device 104 then presents the yield confirmation marker 174 as determined by the training controller 102.

The yield confirmation marker 174 instructs driving behavior to yield the right of way at the path at which it is displayed. The driver is thereby notified of the path at which the right of way is to be yielded, and encouraged to yield the right of way at that path. Accordingly, driver engagement may be increased.

To further encourage the driving behavior instructed by the yield confirmation marker 174, the adherence controller 106 continuously determines the current and aggregate level of adherence to driving cue provided by the yield confirmation marker 174 (the yield confirmation marker driving cue). The current level of adherence to the yield confirmation marker driving cue may be determined based on whether the driver engages in driving behavior indicative of yielding the right of way at the path. For example, the current level of adherence to the yield confirmation marker driving cue may be determined to increase as a speed of the vehicle decreases while the vehicle approaches the position of the yield confirmation marker 174.

More particularly, the adherence controller 106 may receive inputs, from at least one of the training controller 102 and the vehicle control system 108, related to the vehicle speed, the vehicle position, and the yield confirmation marker 174 position and orientation. The inputs may be based on detections made by one or more of the operational sensors 110, the environmental sensors 112, or any other sensors and/or systems included or communicating with the vehicle control system 108. The current level of adherence to the yield confirmation marker driving cue may be determined as a percentage of deceleration of the vehicle from a traveling speed when the vehicle is within a first predetermined range of the position of the yield confirmation marker 174 (e.g., 500 feet, 1000 feet, etc.) to a travelling speed when the vehicle is within a second predetermined range of the yield confirmation marker 174 (e.g., 20 feet, 100 feet, etc.), which is closer to the yield confirmation marker 174 than the first predetermined range.

For example, if the vehicle is traveling at 25 mph when it enters the first predetermined range, and slows to 0 mph prior to or when entering the second predetermined range, the current level of adherence to the yield confirmation marker driving cue is determined to be 100%. If the vehicle slows down to 10 mph, then the current level of adherence to the yield confirmation marker driving cue is determined to be 60%. If the vehicle does not slow down at all, the current level of adherence to the yield confirmation marker driving cue is determined to be 0%. It is to be appreciated that the current level of adherence to the yield confirmation marker driving cue may additionally or alternatively be determined based on a deceleration rate of the vehicle, as a binary event (100% if the vehicle yields the right of way, 0% if the vehicle does not yield the right of way), and/or using a different method not explicitly described herein.

The adherence controller 106 is also configured to continuously determine an aggregate level of adherence to the yield confirmation marker driving cue. The aggregate level of adherence to the yield confirmation marker driving cue may be determined by taking a time average of the current levels of adherence to the yield confirmation marker driving cue over the predetermined time period. This determination may be made in the same manner as that described above with respect to the determination of the aggregate level of adherence to the vehicle surrounding grid and/or merging guide driving cues. Alternatively, the average of all trials (each trial being a single presentation of the yield confirmation marker 174) taken over the predetermined time period may be used as the aggregate level of adherence to the yield confirmation marker driving cue.

The adherence controller 106 may communicate the current and/or aggregate levels of adherence to the yield confirmation marker driving cue to one or both of the training controller 102 and the HUD display device 104 such that either or both of the current and aggregate levels of adherence to the yield confirmation marker driving cue may be presented to the driver by the HUD display device 104. The current and/or aggregate levels of adherence to the yield confirmation marker driving cue may be presented as augmented reality graphic elements incorporated with or separate from the yield confirmation marker 174 by the HUD device 104 projecting graphic elements on the windshield 116 of the vehicle. As shown in FIG. 6, only the aggregate level of adherence to the yield confirmation marker driving cue is presented to the driver by the HUD display device 104 separate from the yield confirmation marker 174 at 176.

By presenting the yield confirmation marker 174 and the continuously determined aggregate level of adherence to the yielding driving cue, the driver is provided with both instantaneous and cumulative feedback related to the instructed driving behavior. The driver is therefore encouraged to set and engage in a safe driving goal for yielding the right of way when appropriate, and the driver's engagement in the goal is increased. By increasing the driver's engagement, the driver training system 100 may thereby prevent driver malaise. Additionally, since the yield confirmation marker 174 and the aggregate level of adherence to the yielding driving cue are presented as augmented reality graphic elements, the driver does not need to look away from the road or adjust his/her focus to view the yield confirmation marker 174 and the aggregate level of adherence to the yielding driving cue. Consequently, driver distraction may also be reduced as compared with the use of instrument panel displays and/or HUDs which project graphic elements onto a windshield.

Figure 7:
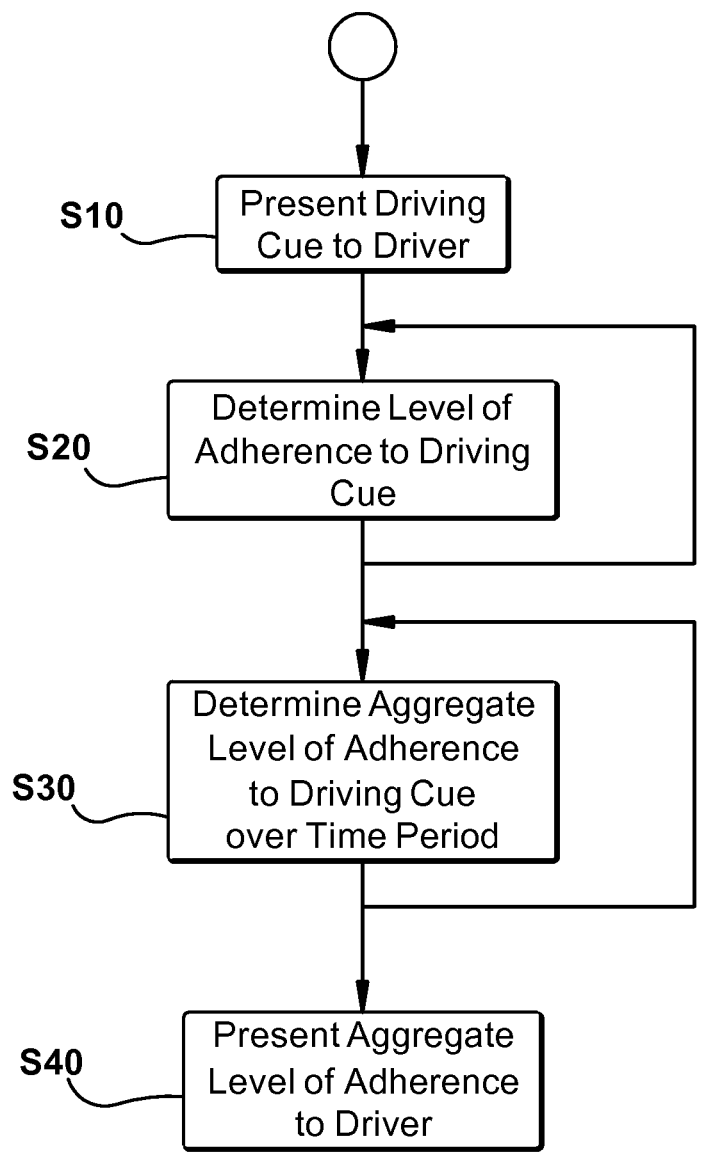
FIG. 7 is a flowchart for a driver training method associated with the driver training system is shown.

Referring to FIG. 7, a flowchart for a driver training method associated with the above-described driver training system 100 is summarized. The method includes the training controller 102 determining the driving cue to be presented to the driver based on inputs received from the vehicle control system 108, and the HUD display device 104 presenting the driving cue to the driver (S10). With reference to the above description of the driver training system 100, it is to be appreciated that any of the described inputs to the training controller 102 from the vehicle control system 108 may be considered to be inputs related to the operational state of the vehicle and the environment surrounding the vehicle. The adherence controller 106 then continuously determines a current level of adherence to the driving cue (S20) and an aggregate level of adherence to the driving cue (S30). The HUD device 104 then presents the aggregate level of adherence to the driving cue to the driver as an augmented graphic reality element (S40). The aggregate level of adherence to the driving cue may be presented to the driver as an augmented graphic reality element separate from the driving cue. Alternatively, the aggregate level of adherence may be displayed by a mechanism other than the HUD display device 104, for example using any other display element in the vehicle (e.g., center dash display, instrument cluster, etc.)

It is reiterated that the current and aggregate level of adherence to the driving cue is continuously calculated by the adherence controller 106, and the HUD device 104 is configured to display the continuously calculated aggregate level of adherence to the driving cue (and/or current level of adherence to the driving cue). Therefore, the level of the adherence to the driving cue presented to the driver changes in real time based on the driver's behavior. Accordingly, the driver is provided with positive feedback when following the driving cues and negative feedback when not following the driving cues. This feedback facilitates goal setting, which increases driver engagement.

In this regard, the driver training system 100 is described above as presenting only the aggregate level of adherence to the driving cue. This may be because the driving cue itself may allow the driver to determine the current level of adherence thereto. Accordingly, immediate feedback is, in a way, implicitly provided by the driving cue. By presenting the aggregate level of adherence to the driving cue, the driver is also provided with feedback related to the overall driving behavior, so as to encourage/train the driver to drive more safely at all times.

It is to be appreciated that the above-discussed driving cues may be simultaneously presented to the driver by the HUD device 104. It is also to be appreciated that different and/or additional driving cues may be presented to the driver, and that the particular driving cues presented to the driver may be different from those described above. Furthermore, the current and aggregate levels of adherence to any of the driving cues may be determined using a method different than that described above. In fact, the above described methods for determining the current and aggregate levels of adherence to any of the driving cues are only exemplary, and may be modified in any way while remaining within the scope of the present disclosure. The adherence controller 106 may be further configured to determine a master current level of adherence to all driving cues and a master aggregate level of adherence to all driving cues, which are indicative of the driver's adherence to all of the presented driving cues. Either or both of the master current level of adherence to all driving cues and the master aggregate level of adherence to all driving cues may be presented to the driver as augmented reality graphic elements by the HUD device 104.

Further still, the current and/or aggregate levels of adherence to any of the driving cues may be determined as a letter grade (e.g., A-F) or a predetermined word (e.g., Perfect, Good, Caution, etc.) associated with the calculated score. Additionally, the current and/or aggregate levels of adherence to the driving cues may be presented in a color coded manner, e.g., with high or good scores presented in green letters, and low or bad scores presented in yellow letters, etc. For example, the background 170 of the merging speed marker 168 may change colors to encourage the driver to accelerate (i.e., it becomes green) or to slow down (i.e., it becomes yellow or red). As a further alternative, the current and/or aggregate levels of adherence may be presented using a progress bar or dial that ranges from 0% to 100%.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A driver training system, comprising:
   a training controller configured to determine a driving cue based on inputs received from a control system of an associated vehicle related to an operational state of the associated vehicle and an environment surrounding the associated vehicle, wherein the training controller receives inputs from at least one operational sensor and at least one environmental sensor and is implemented at least in part via a processor of a computer;
   a driving cue adherence controller configured to continuously determine a current level of adherence to the driving cue presented to a driver of the associated; and
   a heads-up display device configured to present the driving cue as an augmented reality graphic element in view of the driver of the associated vehicle by projecting graphic elements on a windshield of the associated vehicle,
   wherein the driving cue instructs driving behavior based on positional weighting of other vehicles in an immediate vicinity of the associated vehicle.

2. The system according to claim 1, wherein the driving cue instructs a driving behavior and is at least one of:
   a vehicle surrounding driving cue that instructs driving behavior to reduce a number of other vehicles in the immediate vicinity of the associated vehicle;
   a merging driving cue that instructs driving behavior to follow a desired merging path and to travel at a desired merging speed when merging onto a roadway; and
   a yielding driving cue that instructs driving behavior to yield a right of way at a particular path,
   and the driving cue adherence controller communicates with the training controller and is configured to continuously determine the current level of adherence to the driving cue presented to the driver based on a variance between the driving behavior instructed by the driving cue and an actual driving behavior based on inputs received by the training controller.

3. The system according to claim 1, wherein
   the driving cue adherence controller is configured to continuously determine an aggregate level of adherence to the driving cue based on the continuously determined current level of adherence to the driving cue over a predetermined time period; and
   the heads-up display device is configured to present the continuously determined aggregate level of adherence to the driving cue in view of the driver by projecting graphic elements on the windshield of the associated vehicle.

4. The system according to claim 3, wherein the continuously determined aggregate level of adherence to the driving cue is presented as an augmented reality graphic element separate from the driving cue.

5. The system according to claim 3, wherein the predetermined time period includes at least one of:
   a time period beginning at a most recent power-on of the associated vehicle and continuing to a current time;
   a time period beginning at a first power-on of the associated vehicle and continuing to the current time; and
   a time period beginning at a resetting of the driver training system and continuing to the current time.

6. The system according to claim 1, wherein the driving cue is a vehicle surrounding grid that instructs driving behavior to reduce a number of vehicles in the immediate vicinity of the associated vehicle, the vehicle surrounding grid including a vehicle representative marker and a plurality of surrounding markers which at least partially surround the vehicle representative marker, the vehicle representative marker representing the associated vehicle and the plurality of surrounding markers each representing a unique region surrounding the associated vehicle;
   the inputs received by the training controller from the associated vehicle control system indicate whether each unique region surrounding the associated vehicle is occupied by another vehicle based, and the training controller is configured to determine the vehicle surrounding grid such that each of the plurality of surrounding markers is highlighted when the unique region represented thereby is occupied by another vehicle;
   the heads-up display device is configured to present the vehicle surrounding grid determined by the training controller as an augmented reality graphic element appearing on a sky focal plane in view of the driver by projecting graphic elements on the windshield of the associated vehicle; and
   the driving cue adherence controller is configured to continuously determine the current level of adherence to the vehicle surrounding grid to increase as a percentage of the plurality of surrounding markers which are highlighted decreases.

7. The system according to claim 6, wherein
   the driving cue adherence controller is configured to continuously determine an aggregate level of adherence to the vehicle surrounding grid based on the continuously determined current level of adherence to the vehicle surrounding grid over a predetermined time period, and
   the heads-up display device is configured to present the continuously determined aggregate level of adherence to the vehicle surrounding grid as an augmented reality graphic element separate from the vehicle surrounding grid by projecting graphic elements on the windshield of the associated vehicle.

8. The system according to claim 1, wherein the driving cue is a merging guide that instructs driving behavior to follow a desired merging path and to travel at a desired merging speed when merging onto a roadway, the merging guide including a merging path line and a merging speed marker, the merging path line showing the desired merging path and the merging speed marker moving along the merging path line at the desired merging speed;
   the inputs received by the training controller from the associated vehicle control system indicate the desired merging path and the desired merging speed, and the training controller is configured to determine the merging path line and the merging speed marker based on the desired merging path and desired merging speed indicated by the received inputs;
   the heads-up display device is configured to present the merging path line and the merging speed marker determined by the training controller as contact-analog augmented reality graphic elements appearing on a road surface in view of the driver by projecting graphic elements on the windshield of the associated vehicle; and the driving cue adherence controller is configured to continuously determine the current level of adherence to the merging guide to increase as a positional variance of the associated vehicle from the merging path line and a speed variance of the associated vehicle from the merging speed marker decrease.

9. The system according to claim 8, wherein the driving cue adherence controller is configured to continuously determine an aggregate level of adherence to the merging guide based on the continuously determined current level of adherence to the merging guide over a predetermined time period, the heads-up display device is configured to present the continuously determined aggregate level of adherence to the merging guide as an augmented reality graphic element by projecting graphic elements on the windshield of the associated vehicle.

10. The system according to claim 1, wherein the driving cue is a yield confirmation marker that instructs driving behavior to yield a right of way at a particular path, and is presented to cover at least a portion of the path at which the associated vehicle is to yield;

inputs received by the training controller from the associated vehicle control system indicate a position and orientation of the yield confirmation marker in the environment surrounding the vehicle, and the training controller determines the yield confirmation marker to be at the position and orientation indicated by the received inputs;

the heads-up display device is configured to present the yield confirmation marker determined by the training controller as an augmented reality graphic element appearing in a frontal focal plane in view of the driver by projecting graphic elements on the windshield of the associated vehicle;

and the driving cue adherence controller is configured to continuously determine the current level of adherence to the yield confirmation marker to increase as a speed of the associated vehicle decreases while the associated vehicle approaches the yield confirmation marker.

11. The system according to claim 10, wherein the driving cue adherence controller is configured to continuously determine an aggregate level of adherence to the yield confirmation marker based on the current level of adherence to the yield confirmation marker over a predetermined time period, the heads-up display device is configured to present the continuously determined aggregate level of adherence to the yield confirmation marker as an augmented reality graphic element separate from the yield confirmation marker by projecting graphic elements on the windshield of the associated vehicle.

12. The system according to claim 1, wherein the training controller is configured to determine a plurality of driving cues, and the heads-up display device is configured to present the plurality of driving cues as augmented reality graphic elements in view of the driver of the associated vehicle, one of the plurality of driving cues is a vehicle surrounding grid that instructs driving behavior to reduce a number of vehicles in the immediate vicinity of the associated vehicle, the vehicle surrounding grid including a vehicle representative marker and a plurality of surrounding markers which at least partially surround the vehicle representative marker, the vehicle representative marker representing the associated vehicle and the plurality of surrounding markers each representing a unique region surrounding the associated vehicle, the inputs received by the training controller from the associated vehicle control system indicate whether each unique region surrounding the associated vehicle is occupied by another vehicle based, and the training controller is configured to determine the vehicle surrounding grid such that each of the plurality of surrounding markers is highlighted when the unique region represented thereby is occupied by another vehicle, and the heads-up display device is configured to present the vehicle surrounding grid determined by the training controller as an augmented reality graphic element appearing on a sky focal plane in view of the driver by projecting graphic elements on the windshield of the associated vehicle.

13. The system according to claim 1, wherein the training controller is configured to determine a plurality of driving cues, and the heads-up display device is configured to present the plurality of driving cues as augmented reality graphic elements in view of the driver of the associated vehicle, one of the plurality of driving cues is a merging guide that instructs driving behavior to follow a desired merging path and to travel at a desired merging speed when merging onto a roadway, the merging guide including a merging path line and a merging speed marker, the merging path line showing the desired merging path and the merging speed marker moving along the merging path line at the desired merging speed, the inputs received by the training controller from the associated vehicle control system indicate the desired merging path and the desired merging speed, and the training controller is configured to determine the merging path line and the merging speed marker based on the desired merging path and desired merging speed indicated by the received inputs, and the heads-up display device is configured to present the merging path line and the merging speed marker determined by the training controller as contact-analog augmented reality graphic elements appearing on a road surface in view of the driver by projecting graphic elements on the windshield of the associated vehicle.

14. The system according to claim 1, wherein the training controller is configured to determine a plurality of driving cues, and the heads-up display device is configured to present the plurality of driving cues as augmented reality graphic elements in view of the driver of the associated vehicle, one of the plurality of driving cues is a yield confirmation marker that instructs driving behavior to yield a right of way at a particular path, and is presented to cover at least a portion of the path at which the associated vehicle is to yield, inputs received by the training controller from the associated vehicle control system indicate a position and orientation of the yield confirmation marker in the environment surrounding the vehicle, and the training controller determines the yield confirmation marker to be at the position and orientation indicated by the received inputs, and the heads-up display device is configured to present the yield confirmation marker determined by the training controller as an augmented reality graphic element appearing in a frontal focal plane in view of the driver by projecting graphic elements on the windshield of the associated vehicle.

15. The system according to claim 12, wherein another of the plurality of driving cues is a merging guide that instructs driving behavior to follow a desired merging path and to travel at a desired merging speed when merging onto a roadway, the merging guide including a merging path line and a merging speed marker, the merging path line showing the desired merging path and the merging speed marker moving along the merging path line at the desired merging speed, the inputs received by the training controller from the associated vehicle control system indicate the desired merging path and the desired merging speed, and the training controller is configured to determine the merging path line and the merging speed marker based on the desired merging path and desired merging speed indicated by the received inputs, and the heads-up display device is configured to present the merging path line and the merging speed marker determined by the training controller as contact-analog augmented reality graphic elements appearing on a road surface in view of the driver by projecting graphic elements on the windshield of the associated vehicle.

16. The system according to claim 15, wherein another of the plurality of driving cues is a yield confirmation marker that instructs driving behavior to yield a right of way at a particular path, and is presented to cover at least a portion of the path at which the associated vehicle is to yield, inputs received by the training controller from the associated vehicle control system indicate a position and orientation of the yield confirmation marker in the environment surrounding the vehicle, and the training controller determines the yield confirmation marker to be at the position and orientation indicated by the received inputs, and the heads-up display device is configured to present the yield confirmation marker determined by the training controller as an augmented reality graphic element appearing in a frontal focal plane in view of the driver by projecting graphic elements on the windshield of the associated vehicle.

17. A driving cue adherence controller for use with an associated driver training system in an associated vehicle, the driving cue adherence controller comprising at least one operational sensor and at least one environmental sensor and at least one processor of a computer which is configured to:

receive inputs from the at least one operational sensor related to an operational state of the associated vehicle and an environment surrounding the associated vehicle;

receive inputs related to a driving cue presented to a driver of the associated vehicle as an augmented reality graphic element that instructs a driving behavior, wherein the driving cue instructs driving behavior based on positional weighting of other vehicles in an immediate vicinity of the associated vehicle;

continuously determine a current level of adherence to the driving cue presented to the driver based on the received inputs from the at least one operational sensor of the operational state of the associated vehicle, from the at least one environmental sensor of the environment surrounding the associated vehicle, and the driving cue presented to the associated vehicle; and continuously determine an aggregate level of adherence to the driving cue based on the continuously determined current level of adherence to the driving cue over a predetermined time period.

18. The driving cue adherence controller according to claim 17, wherein the driving cue is at least one of:

a vehicle surrounding driving cue that instructs driving behavior to reduce a number of other vehicles in the immediate vicinity of the associated vehicle;

a merging driving cue that instructs driving behavior to follow a desired merging path and to travel at a desired merging speed when merging onto a roadway; and a yielding driving cue that instructs driving behavior to yield a right of way at a particular path, and the driving cue adherence controller is configured to continuously determine the current level of adherence to the driving cue based on a variance between driving behavior instructed by the driving cue and an actual driving behavior.

19. A driver training method, comprising:

presenting a driving cue which instructs a driving behavior to a driver as an augmented reality graphic element through a heads-up display device, wherein the driving cue instructs driving behavior based on positional weighting of other vehicles in an immediate vicinity of the associated vehicle such that other vehicles in a same lane as the associated vehicle are weighted more than other vehicles in a different lane than the associated vehicle;

continuously determining a current level of adherence to the driving cue presented to the driver by monitoring a variance between the driving behavior instructed by the driving cue and an actual driving behavior;

continuously determining an aggregate level of adherence to the driving cue presented to the driver based on the current level of adherence to the driving cue determined over a predetermined time period; and presenting the aggregate level of adherence to the driving cue to the driver as an augmented reality graphic element separate from the driving cue through the heads-up display device, wherein at least one of the presenting the driving cue, determining the current level, determining the aggregate level, or presenting the aggregate level is based on inputs received from at least one operational sensor and at least one environmental sensor and is implemented via a processor of a computer.

\* \* \* \* \*